United States Patent
Stein et al.

(10) Patent No.: US 9,881,039 B2
(45) Date of Patent: Jan. 30, 2018

(54) REBALANCING OPERATION USING A SOLID STATE MEMORY DEVICE

(75) Inventors: Yan Wang Stein, San Jose, CA (US); Harshwardhan S. Mulay, Pune (IN); Abhinay R. Nagpal, Pune (IN); Sandeep Ramesh Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 465 days.

(21) Appl. No.: 12/472,321

(22) Filed: May 26, 2009

(65) Prior Publication Data
US 2010/0306288 A1    Dec. 2, 2010

(51) Int. Cl.
*G06F 17/30* (2006.01)

(52) U.S. Cl.
CPC .............. *G06F 17/30312* (2013.01)

(58) Field of Classification Search
CPC .... G06F 9/5083; G06F 3/067; G06F 11/3433; G06F 17/30194; G06F 17/30221; G06F 2206/1012; G06F 3/0614; G06F 3/0647; G06F 17/30312
See application file for complete search history.

(56) References Cited

U.S. PATENT DOCUMENTS

| | | | |
|---|---|---|---|
| 5,687,369 A * | 11/1997 | Li | |
| 6,023,699 A | 2/2000 | Knoblock et al. | |
| 6,029,168 A | 2/2000 | Frey | |
| 6,178,520 B1 * | 1/2001 | DeKoning | G06F 3/0607 711/114 |
| 6,269,375 B1 | 7/2001 | Ruddy et al. | |
| 6,405,284 B1 | 6/2002 | Bridge | |
| 7,000,141 B1 | 2/2006 | Karlsson et al. | |
| 7,089,281 B1 * | 8/2006 | Kazemi | G06F 3/0613 709/203 |
| 7,346,925 B2 * | 3/2008 | Marcjan | H04L 63/101 726/12 |
| 7,356,730 B2 * | 4/2008 | Ulrich et al. | 714/6.12 |
| 7,386,663 B2 | 6/2008 | Cousins | |
| 7,761,678 B1 * | 7/2010 | Bodmer | G06F 11/3485 711/114 |
| 7,921,257 B1 * | 4/2011 | Kleiman | G06F 11/1076 708/531 |
| 2003/0037247 A1 * | 2/2003 | Obara et al. | 713/193 |

(Continued)

OTHER PUBLICATIONS

Awerbuch et al., Consistent and Compact Data Management in Distributed Storage Systems, ACM Digital Library, SPAA '04, Jun. 27, 2004, Barcelona, Spain (10 pgs).

(Continued)

*Primary Examiner* — Huawen A Peng
(74) *Attorney, Agent, or Firm* — Toler Law Group, PC

(57) ABSTRACT

Systems and methods to manage database data are provided. A particular method includes automatically identifying a plurality of storage devices. The storage devices include a first device of a first type and a second device of a second type. The first type includes a solid state memory device. The method may further identify a high priority data set of the database. A rebalancing operation is conducted that includes moving the high priority data set to the solid state memory device and substantially evening distribution of other data of the database among the storage devices.

20 Claims, 6 Drawing Sheets

(56) References Cited

U.S. PATENT DOCUMENTS

| | | | |
|---|---|---|---|
| 2003/0236815 A1* | 12/2003 | Brenner | G06F 9/505 718/104 |
| 2007/0083482 A1* | 4/2007 | Rathi et al. | 707/1 |
| 2008/0256147 A1 | 10/2008 | Anand et al. | |
| 2009/0144347 A1* | 6/2009 | Boyd | G06F 3/061 |
| 2009/0276588 A1* | 11/2009 | Murase | G06F 3/0608 711/160 |
| 2010/0199036 A1* | 8/2010 | Siewert et al. | 711/112 |

OTHER PUBLICATIONS

Grust et al., Accelerating XPath Evaluation in Any RDBMS, ACM Digital Library, ACM Transactions on Database Systems, vol. 29, No. 1, Mar. 2004 (41 pgs).

* cited by examiner

REBALANCING OPERATION USING A SOLID STATE MEMORY DEVICE

I. BACKGROUND

The present disclosure is generally related to database management systems, and more particularly, to rebalancing operations for substantially evenly redistributing data among memory devices.

II. DESCRIPTION OF RELATED ART

Storage devices, such as disk drives, operate efficiently when data is distributed evenly as among the storage devices. When one disk becomes overburdened with data, access times may be increased for data stored on the disk. The disk may further wear out at a different rate than other storage devices used by a computing system, which may present maintenance challenges. Disparate data volumes as between storage devices may result from the addition or deletion of disk drives as well as from statistical fluctuations over time.

These imbalances can be addressed by running one or more rebalancing processes. Rebalancing processes relocate memory to substantially even out the allocation of memory transfer segments, or extents, across disk drives in a disk group. For example, rebalancing operations may move data from a disk drive with too much data to one with less data. Disk drives with the most data and the least data may be initially chosen for the rebalancing operation. Other disk drives may be chosen if one of the chosen disk drives is in the middle of another rebalancing relocation.

Improvements realized by rebalancing techniques have led to increased demand for even greater performance and broader application. For example, there is a need for even faster and more energy efficient access to memory. There is also a need for lighter and more robust memory for smaller devices.

III. BRIEF SUMMARY

Systems and methods to manage data allocation to storage devices are provided. In an embodiment, a computer program product includes a computer usable medium including computer readable program code that when executed on a computer causes the computer to identify a plurality of storage devices. The plurality of storage devices includes a first device of a first type and a second device of a second type. The first type includes a solid state memory device. The computer readable program code further causes the computer to identify a high priority data set of the database. The program code is executable by the computer to conduct a rebalancing operation that includes moving the high priority data set to the solid state memory device and substantially evening distribution of other data of the database with respect to the plurality of storage devices.

In another particular embodiment, a method includes automatically identifying a plurality of storage devices. The storage devices include a first device of a first type and a second device of a second type. The first type includes a solid state memory device. The method further includes identifying a high priority data set of a database. A rebalancing operation is conducted that includes storing the high priority data set at the solid state memory device and substantially evening distribution of other data of the database among the storage devices.

In another particular embodiment, a method includes automatically identifying different types of storage disks for use by a database. The storage disks store database data and include a solid state drive. The method further includes identifying a high priority data set of the database data and conducting a rebalancing operation that includes moving the high priority data set to the solid state drive and evenly distributing the database data among the storage disks.

In another particular embodiment, an apparatus includes a processor and a memory accessible to the processor. The apparatus also includes a plurality of storage devices. The storage devices include a first device of a first type and a second device of a second type. The first type includes a solid state memory device. The memory further includes instructions executable by the processor. The instructions are executable by the processor to identify the storage devices and a high priority data set of a database. The instructions are further executable by the processor to conduct a rebalancing operation that includes moving the high priority data set to the solid state memory device and substantially evening distribution of other data of a database among the storage devices.

IV. BRIEF DESCRIPTION OF THE DRAWINGS

Figure 1:
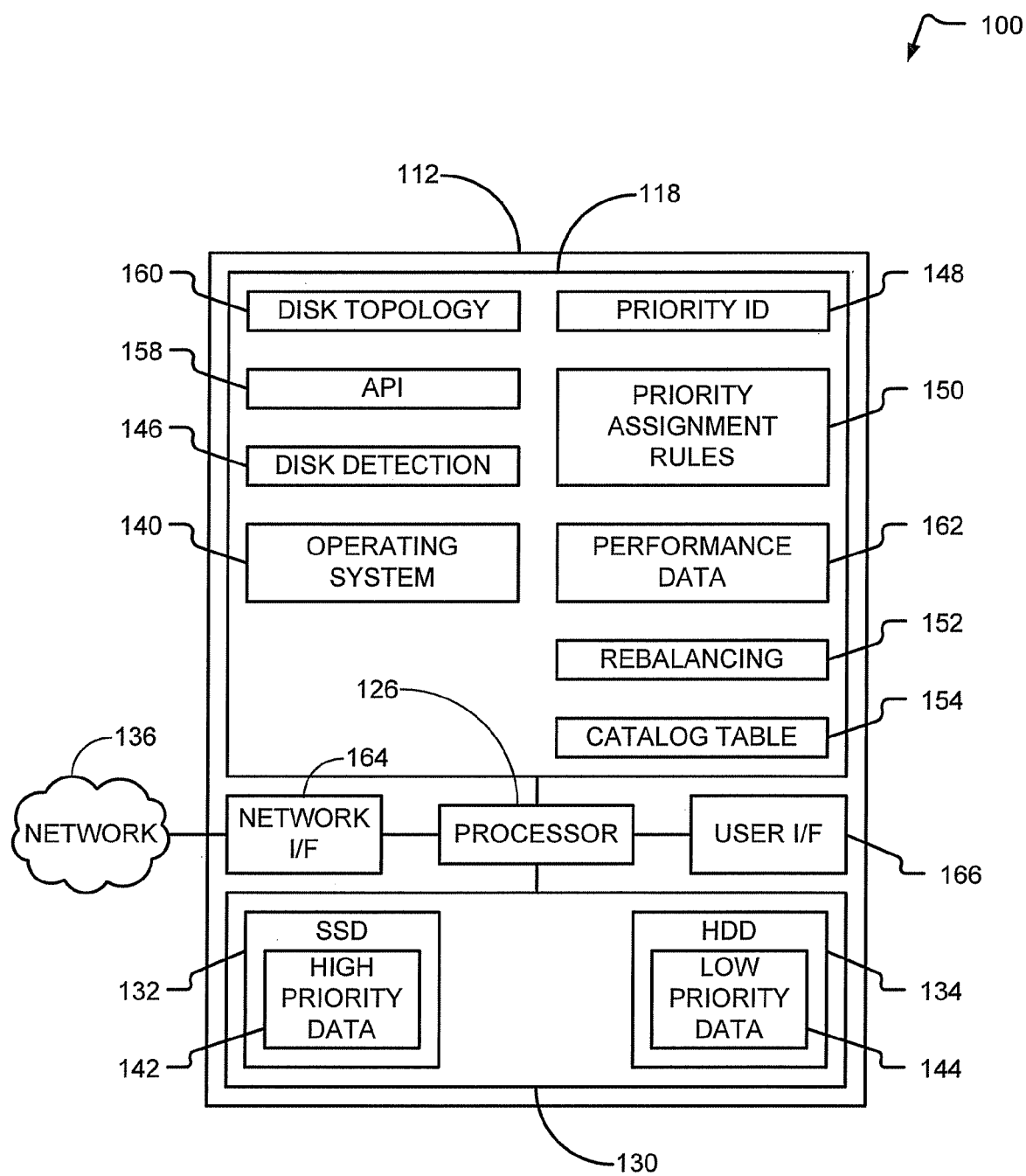
FIG. 1 is a block diagram of an illustrative computer system configured to manage database data by conducting a rebalancing operation that includes automatically identifying database storage devices, prioritized data, and moving high priority data to a solid state memory device.
Figure 5:
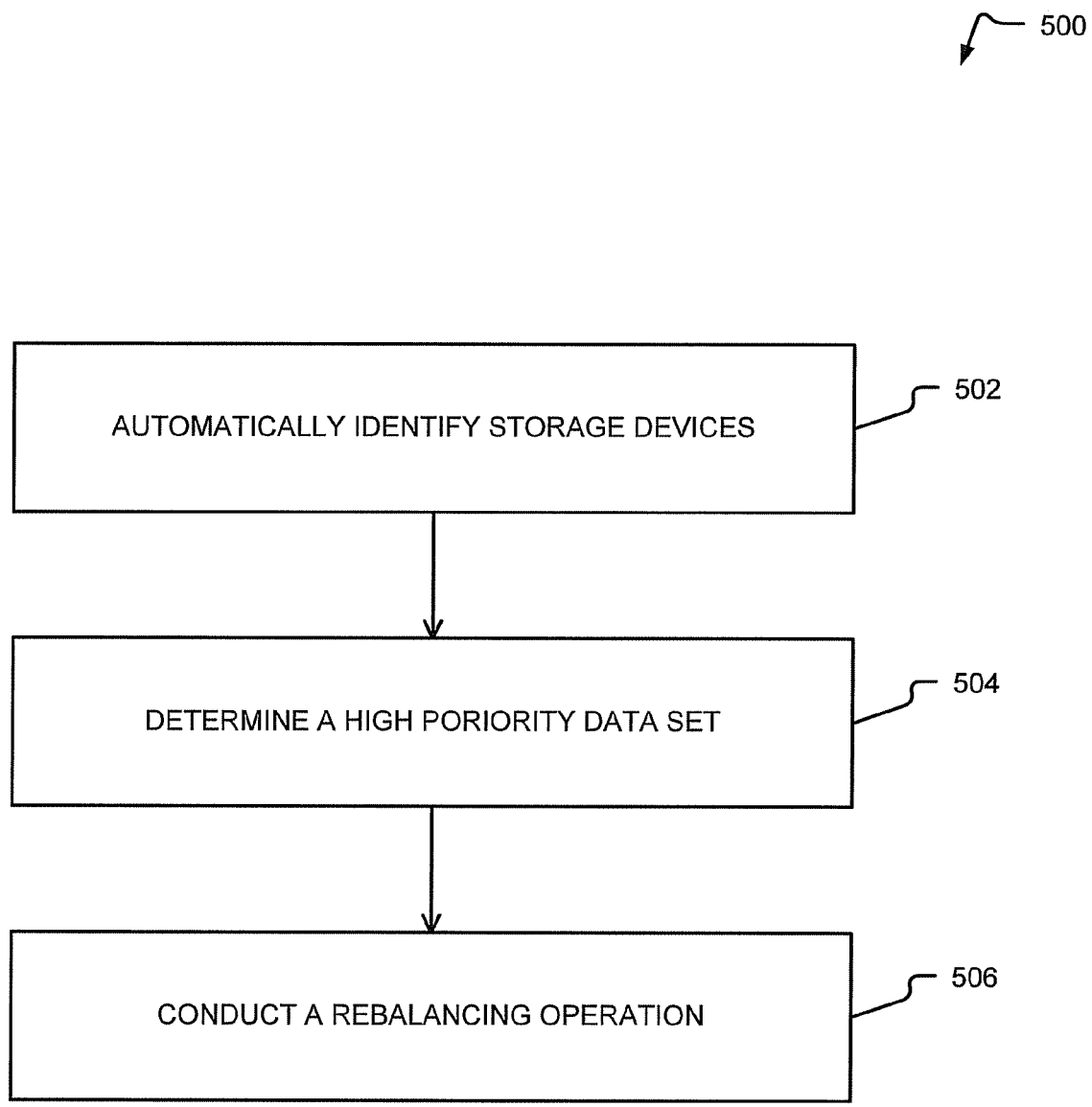
Figure 6:
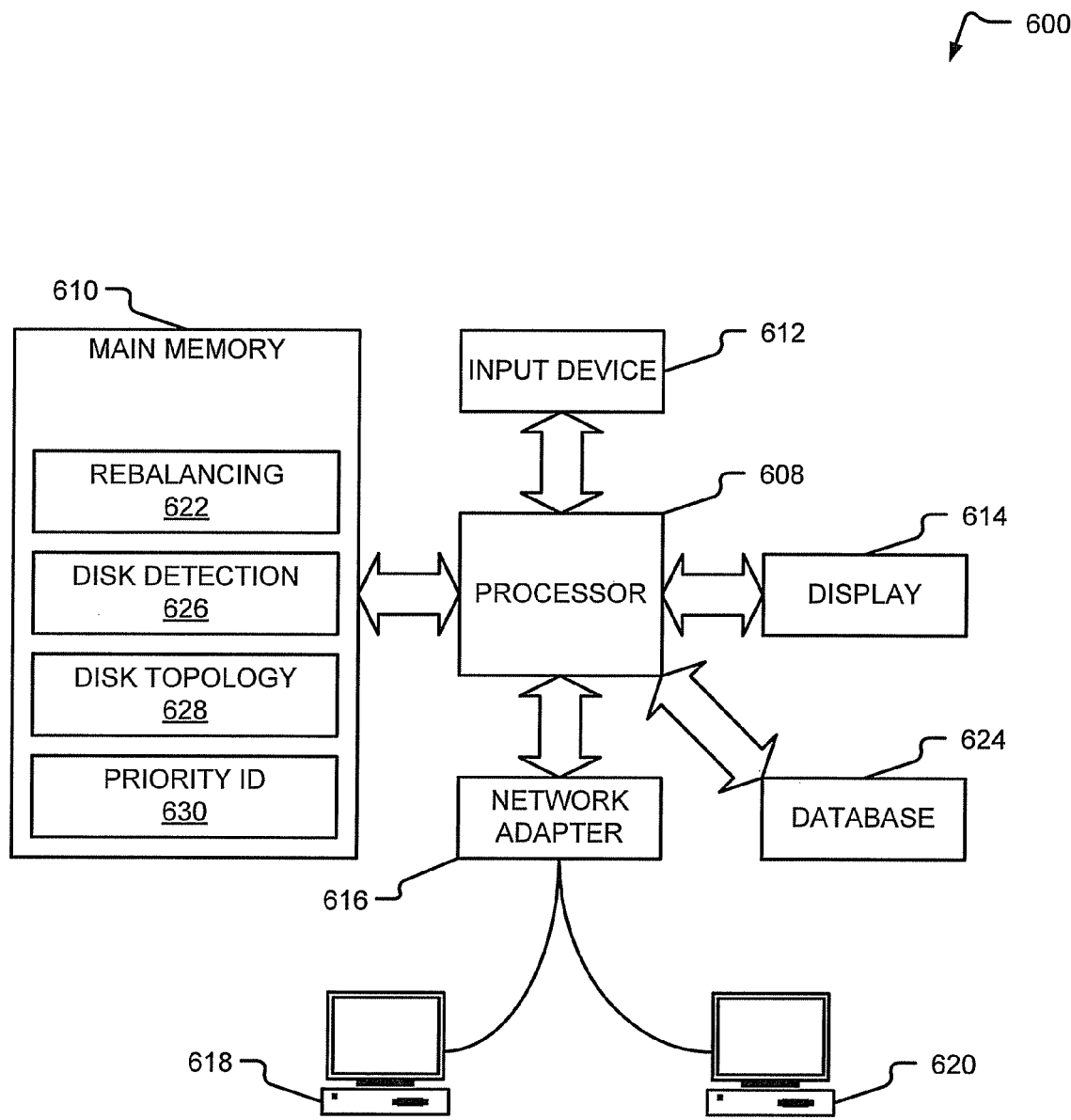

FIG. 5 is a flowchart illustrating another particular embodiment of a method executable by the computer system of FIG. 1 to manage a database; and FIG. 6 is a block diagram of another illustrative computing system configured to manage database data by conducting a rebalancing operation according to data prioritization and using different types of data storage devices, such as the data storage device of FIG. 1.

V. DETAILED DESCRIPTION

FIG. 1 illustrates a computing apparatus, such as a computer system 100, configured to manage database data. In one aspect, the computer system 100 may conduct a rebalancing operation that includes automatically identifying database storage devices and high priority data and moving the high priority data to a solid state memory device.

The system 100 of FIG. 1 includes at least one computer 112. The computer 112 shown in FIG. 1 may represent any type of computer, computer system, or other programmable electronic device capable of functioning as a client or a server in a client-server environment. Moreover, the computer 112 may be implemented using one or more networked computers (e.g., in a cluster or other distributed computing system).

The computer 112 includes a central processing unit, or processor 126, that may be coupled to a memory 118. The memory 118 may include an operating system 140. The computer 112 generally operates under the control of the operating system 140. The operating system 140 may generally function as an interface between hardware of the computer 112 and applications of the computer 112.

The operating system 140 additionally may act as a host for applications that execute on the computer 112. As a host, the operating system 140 may manage details of the application as related to the operation of the hardware.

The memory 118 may also include various computer software applications, components, programs, objects, modules, and data structures that are executable by the processor 126. For example, disk detection instructions 146 may be executable by the processor 126 to determine what type of storage disks are included in a database including a mass storage 130.

The mass storage 130 may include solid state drive devices 132 in addition to hard disk drive devices 134. A solid state drive may include a data storage device that uses solid state memory to store persistent data. Unlike hard disk drives, solid state drives do not use mechanical moving parts. An application programming interface (API) 158 may be used by the disk detection instructions 146 to query system data structures. The API 158 may further be used to identify different types of disk types 132, 134 of the mass storage 130 to determine a performance attribute. For example, a particular disk type may have relatively quicker access times. Another or the same disk type may be relatively more energy efficient.

A disk topology 160 may be created by the disk detection instructions 146 and may maintain information that indicates what part of a database is maintained on what type of disk. The disk topology 160 may further store the identified type of disk in logical association with known advantages of the respective disk storage devices. For example, a first disk storage device may be classified as a solid state disk. The solid state disk may be logically associated with relatively quick read and write performance characteristics. A second disk storage device may include a hard disk drive and may be associated with relatively slower performance characteristics. In another example, a particular storage device (e.g., a solid state device) may be associated with high energy efficiency.

Priority data identification instructions 148 may be executable by the processor 126 to identify high priority data 142 stored within the mass storage 130. The priority data identification instructions 148 may further assign a priority to the data. For example, a priority may be assigned to one or more of bootstrap data, high frequency data, time-intensive data, and user specified data.

Bootstrap data may include data used at startup. For example, bootstrap data may be accessed to initiate operating systems when a computing system is activated. Examples of boot data include catalog tables, packages, active log files, and indexes, or index data. High frequency data may include high frequency, low cache hit ratio data objects. Time-intensive data may include data, the processing of which may result in better performance. Encrypted data may take longer to process than unencrypted data, so including the encrypted data on a relatively faster solid state drive device may reduce database access time.

Priority assignment rules 150 may include instructions as to how priorities are automatically or manually assigned to data. For example, the priority assignment rules 150 may include instructions executable by the processor 126 to assign a high priority to high frequency data (i.e., data that is frequently accessed). For instance, certain types of data may be stored in a solid state device because the data has a historically high rate of access. Performance data 162 may be maintained within the memory 118 to provide a record of a frequency with which data is historically accessed.

In another particular embodiment, an indicator, or tag, associated with a high priority may be assigned to data that should be stored in a relatively energy efficient manner. For example, data that is frequently accessed may be assigned to energy efficient solid state drive devices to reduce the amount of power used by the database over time. Other instructions in the priority assignment rules 150 may be manually input. For example, a type of data, such as financial record data, may be designated for automatic identification and association with a high priority, irrespective of how frequently the financial data is historically accessed.

In another example, time-intensive data, such as encrypted data and authentication routines, may be allocated to the solid state drive devices. Unencrypted data may be allocated to the hard disk drive devices. Encrypted data may take longer to process than unencrypted data, so including the encrypted data on a relatively faster solid state drive device may reduce database access time. Though the encrypted data may not be accessed with as high of a frequency as other data, the encrypted data may be automatically redistributed to the solid state drive to reduce access times of the database.

Rebalancing instructions 152 may be executable by the processor 126 to substantially evenly distribute data among different storage devices 132, 134 of the mass storage 130. According to one particular embodiment, the rebalancing instructions 152 may be executed to move the high priority data 142 to the solid state drive device 132 of the mass storage 130. Lower priority data 144 may be moved to the hard disk drive device 134 of the mass storage 130. For example, the lower priority data 144 may be deleted from solid state drive device 132 after being copied onto the hard disk drive device 134 of the mass storage 130.

A catalog table 154 may maintain pointers or other identifiers associated with the addresses of data stored within the storage devices of the database. The catalog table 154 may be updated with data addresses after a rebalancing operation to maintain memory striping. Data striping, or memory/disk striping, includes dividing a body of data into blocks and spreading the data blocks across several partitions on several hard disks. Each stripe may be the size of the smallest partition.

The memory 118 may represent random access memory (RAM) devices comprising main storage of the computer 112, as well as any supplemental levels of memory (e.g., cache memories, non-volatile or backup memories such as programmable or flash memories, or read-only memories). In addition, the memory 118 may include memory storage physically located elsewhere in the computer 112 (e.g., cache memory in the processor 126, as well as any storage capacity used as a virtual memory, such as memory on the mass storage device 130 or on another computer coupled to the computer 112 via a network interface 164 and a network 136. The computer 112 may receive and output data via a user interface 166.

FIG. 1 thus shows a client-server based computer system 100 configured to conduct a rebalancing operation that includes automatically identifying database storage devices and high priority data. The high priority data may be moved to a solid state memory device to promote more efficient access and energy usage.

Figure 2:
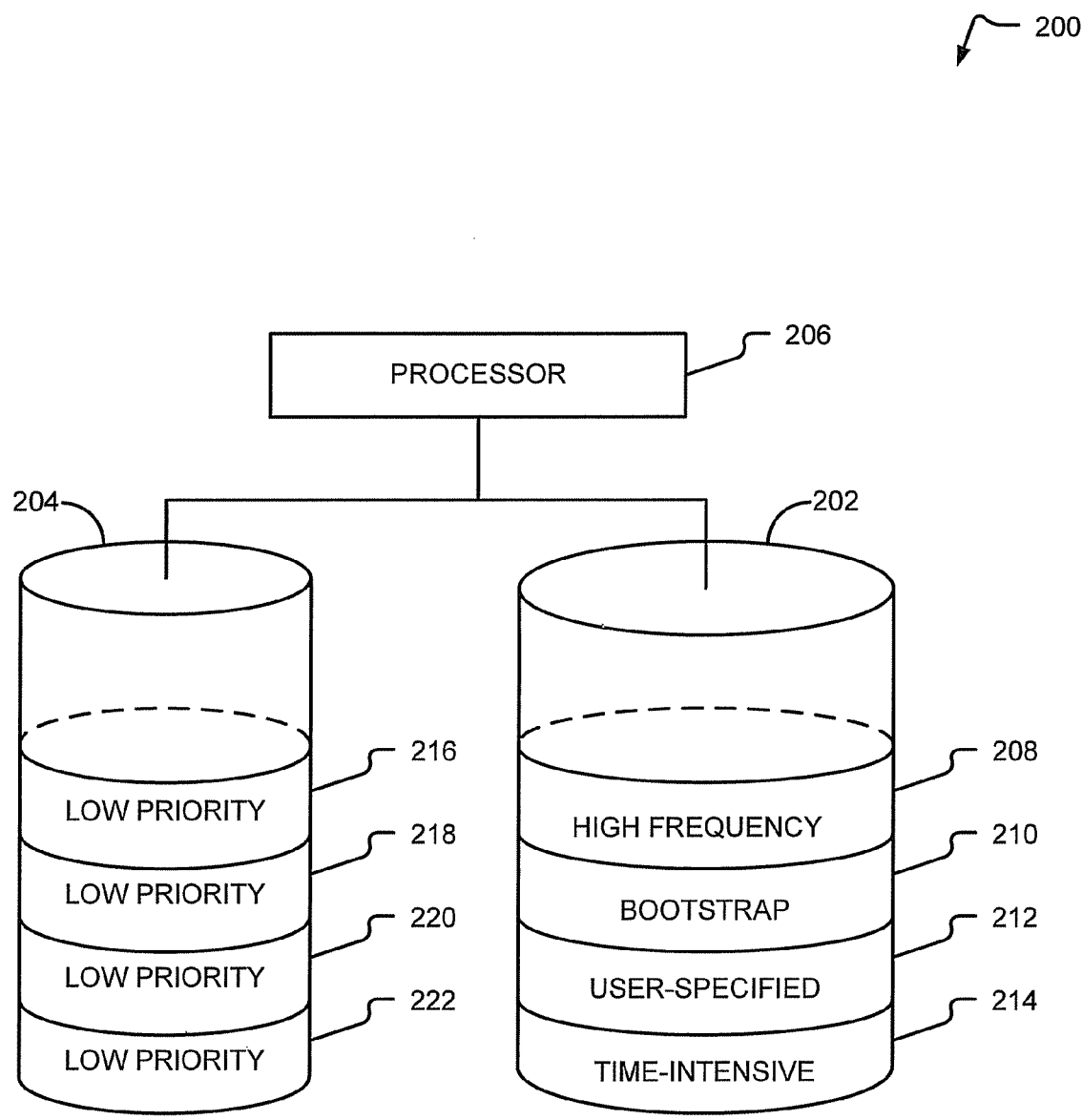
FIG. 2 is a general diagram that depicts a database having access to different types of data storage devices, such as the data storage devices of FIG. 1.

FIG. 2 shows a block diagram of memory management system 200 that includes different types of data storage devices, such as the data storage devices of FIG. 1. FIG. 2 particularly depicts a first storage device 202 and a second storage device 204. The first storage device 202 may include a solid state device, such as a flash drive. The second storage device 204 may include a hard disk drive device. The first and second storage devices 202, 204 may include physically separate hardware devices. In an illustrative embodiment, the first storage device 202 of FIG. 2 is the storage device 132 of FIG. 1, and the second storage device 204 of FIG. 2 is the storage device 134 of FIG. 1.

Data may be substantially evenly distributed between the first device 202 and the second device 204. The substantially even distribution may be the result of a rebalancing operation executed by a processor 206. Moreover, the first storage device 202 may store high priority data. Exemplary high priority data may include high frequency (frequently accessed) data 208, bootstrap data 210, a user-specified data 212, and time-intensive data 214. The second storage device 204 may store less frequently accessed or otherwise lower priority data 216, 218, 220, 222.

As discussed herein, high frequency data 208 may include high frequency, low cache hit ratio data objects. Bootstrap data 210 may be accessed to initiate operating systems and may include catalog tables, packages, active log files, and index data. Time-intensive data 214 may include data, such as encrypted data, the processing of which may result in better performance.

FIG. 2 shows a database comprising different types of storage devices 202, 204. Data may be selectively stored in the respective storage devices based upon the type of storage devices, as well as the uses of the data to be stored. For example, higher priority data may be stored within a solid state drive device to promote more efficient access and energy usage.

Figure 3:
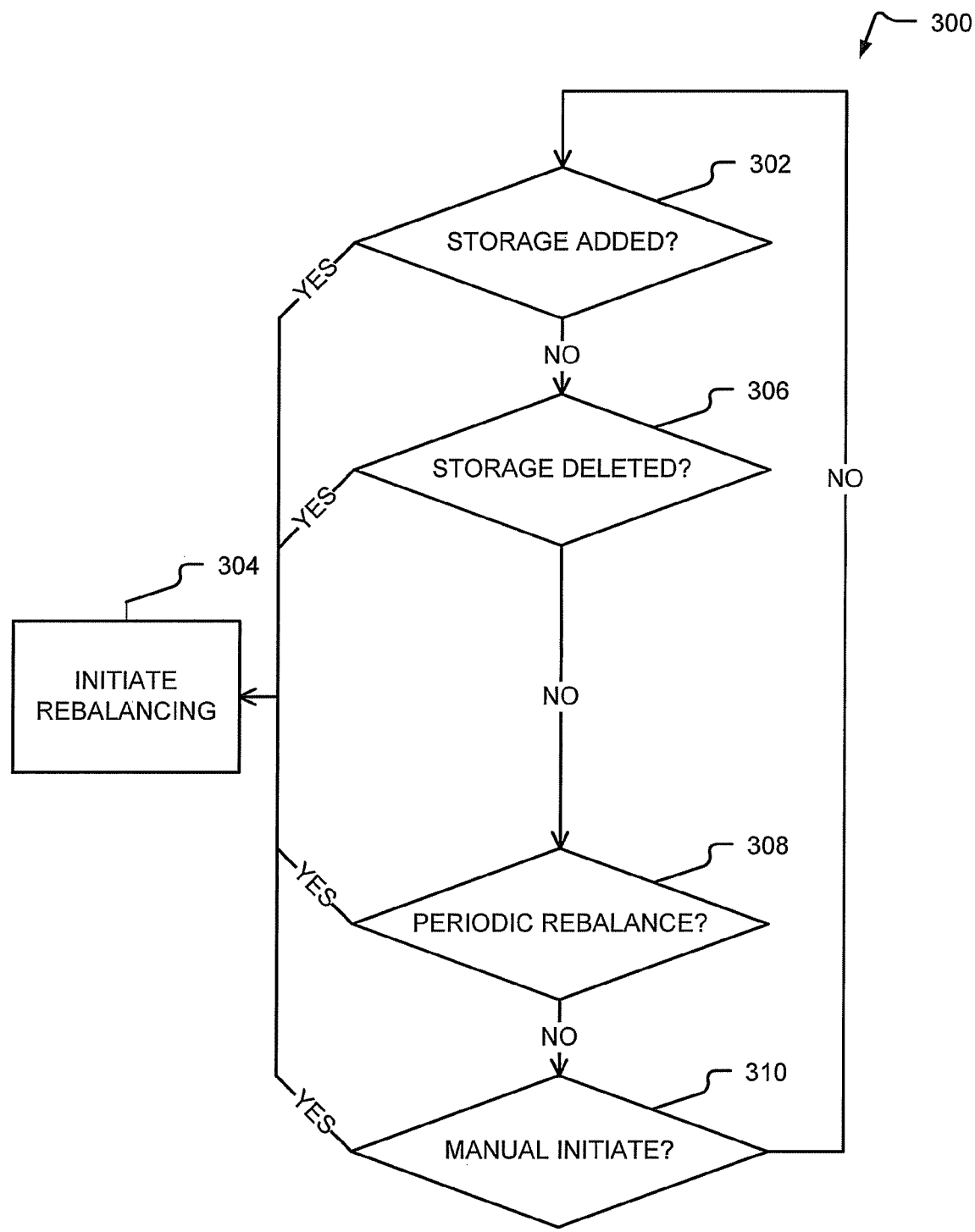
FIG. 3 is a flowchart illustrating a particular embodiment of a method executable by the computer system of FIG. 1 to manage database data by initiating a rebalancing operation.

FIG. 3 is a flowchart showing a method 300 to initialize rebalancing database data. In an illustrative embodiment, the method 300 may be performed by the system 100 of FIG. 1. The method 300 particularly shows instances where a rebalancing operation may be initiated. As discussed herein, a rebalancing operation may substantially evenly distribute data throughout a plurality of storage devices. Higher priority data may be allocated to solid state drive devices, while lower priority data may be allocated to hard disk drive devices.

The method 300 may determine if a storage device has been added, at 302. For example, the system 100 of FIG. 1 may determine that a storage device 132 has been added for database use. The added storage device may include a physical disk device or a logical container associated with a storage disk. If a storage device has been added, a rebalancing operation may be initiated, at 304. In the particular embodiment illustrated in FIG. 3, the rebalancing operation 304 may continue until the data is substantially evenly distributed among the plurality of storage devices.

Alternatively, at 306, the system 100 may determine if a storage device has been deleted. A change in the number of storage devices may prompt the initiation of a rebalancing operation, at 304.

The system 100 may be configured to initiate a rebalancing operation at regular intervals, at 308. As part of routine database maintenance, the system 100 may track a time period since a last rebalancing operation. Where the tracked time exceeds a preset interval duration, such as determined at 308, the system 100 may initiate a rebalancing operation, at 304.

At 310, a rebalancing operation may be manually initiated in response to manual input. The database management processes of the flowchart of FIG. 3 may continue to loop, at block 302.

In a particular embodiment, a rebalancing operation may be conducted for a preset period, and may not evenly distribute the data among the storage devices in single operation. Instead, two or more operations may be initiated over time to substantially evenly distribute the data.

It will be appreciated that the method 300 of FIG. 3 enables the initiation of a rebalancing operation in response to an actual or likely change in a distribution of data as among storage devices. Thus, the method 300 may be used to automatically rebalance the data in a manner that promotes efficient access times and reliability.

Figure 4:
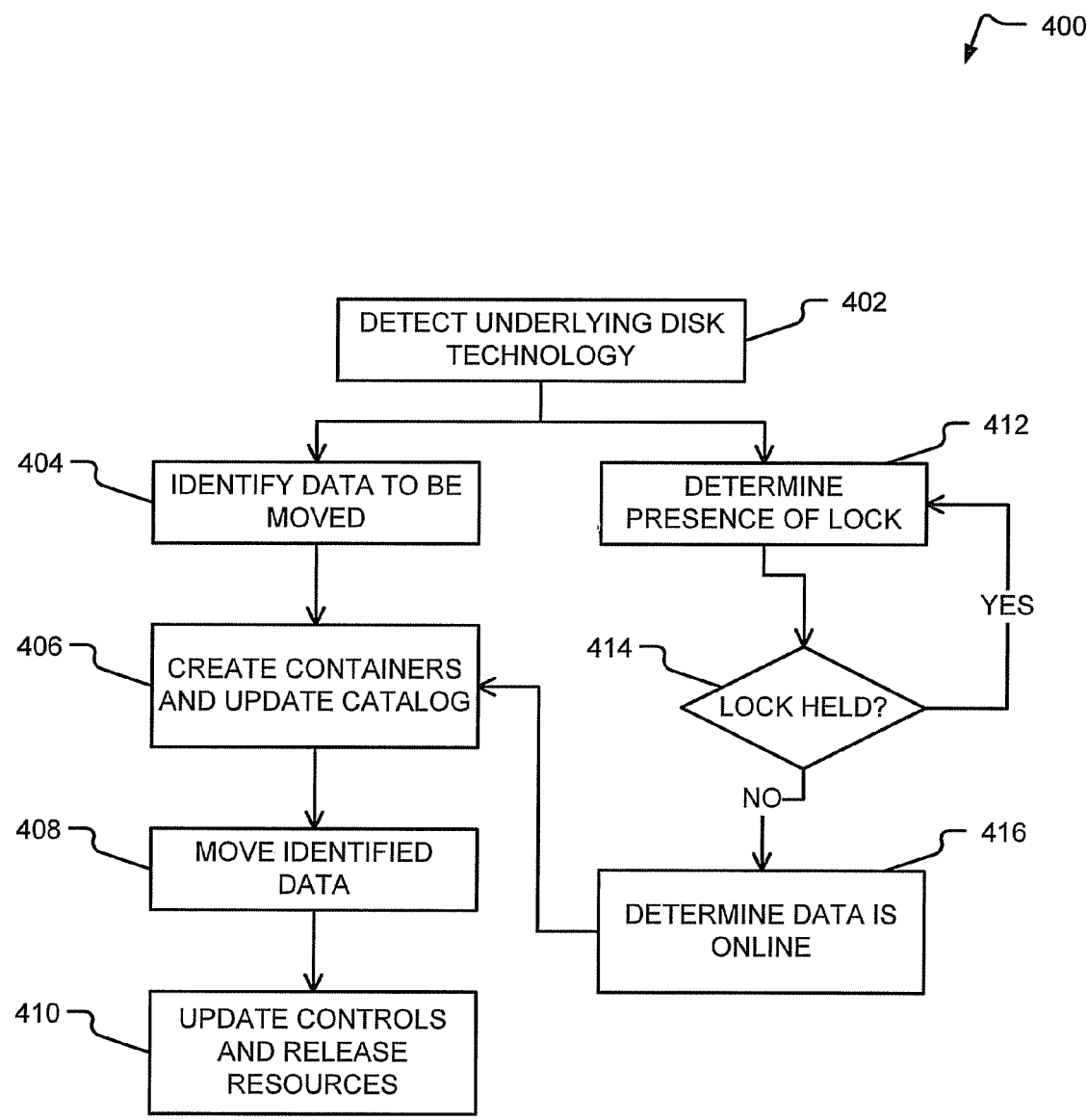
FIG. 4 is a flowchart illustrating a particular embodiment of a method executable by the computer system of FIG. 1 to conduct a rebalancing operation.

FIG. 4 is a flowchart including a method 400 to conduct a rebalancing operation. In one example, the method 400 may be performed by the system 100 of FIG. 1. As such, the method 400 may be executed as part of a process to substantially evenly distribute data among storage devices.

An underlying disk technology may be identified, at 402. For example, the system 100 of FIG. 1 may use the API 158 to query system data structures and to identify different types of hard disk types of the mass storage 130. A disk topology 160 may be created that maintains which part of a database is maintained on which type of disk. The disk topology 160 may further store the type of disk in logical association with advantages of the respective disks. For example, a first disk storage device 132 of FIG. 1 may be classified as a solid state disk and may be logically associated with relatively quick read and write performance characteristics. A second disk storage device 134 of FIG. 1 may include a hard disk drive and may be associated with relatively slower performance characteristics.

Data to be moved to a solid state drive may be determined, at 404. In a particular embodiment, high priority data may be identified for moving to the solid state drive, and lower priority data may be identified and designated for moving to hard disk drive storage. For example, the priority data identification instructions 148 of FIG. 1 may be executed by the processor 126 to identify high priority data 142 stored within the mass storage 130. The priority data identification instructions 148 may further assign a priority to the data. For example, a high priority may be assigned to one or more of high frequency data, bootstrap data, a user-specified data, and time-intensive data.

Containers may be automatically created over the solid state drive, at 406. System catalogs, or memory tables, may further be updated. For example, the priority assignment rules 150 of FIG. 1 may include instructions for the system 100 to place frequently accessed data into a container associated with the solid state drive. Historical performance data may be accessed to determine what data has been accessed most frequently. Additionally, the catalog table 154 of FIG. 1 may be updated with the data address of the newly created containers to maintain data striping.

The identified data may be automatically moved to new container paths, at 408. In a particular embodiment, high priority data may be moved to a solid state drive, and lower priority data may be moved to hard disk drive storage.

Controls may be updated and resources may be released, at 410. For example, the system 100 of FIG. 1 may release at 410 any locks placed on accessing the data while the data was moved during the rebalancing operation.

The method 400 may determine if a lock is present on object data, at 412. For example, the system of FIG. 1 may determine that a lock is being held on index data. Proceeding to 414, a decision is made as to whether the lock is still held. When the lock is released, the object data may be determined to be online, at 416. In a particular embodiment, a priority of the online object data may then be determined, at 406. For example, the system 100 of FIG. 1 may determine that index data has a high priority.

In this manner, the method 400 of FIG. 4 may reorganize data during rebalancing using priority assignment rules 150. The most frequently accessed data may be stored on the solid state drive to capitalize on the relatively fast access performance of the technology.

FIG. 5 is a flowchart including another method 500 of managing a database. In one example, the method 500 may be performed by the system 100 of FIG. 1. A plurality of storage devices may be automatically identified, at 502. Referring to FIG. 1, the plurality of storage devices may include a first storage device 132 of a first type and a second storage device 134 of a second type. The first type may include a solid state memory device.

For example, referring to FIG. 1, the system 100 may use the API 158 to query system data structures and to identify different types of hard disk types of the mass storage 130. A disk topology 160 may be created that maintains information indicative of which part of a database is maintained on which type of disk. The disk topology 160 may further store the type of disk in logical association with advantages of the respective disks. For example, the first disk storage device may be classified as a solid state disk and may be logically associated with relatively quick read and write performance characteristics. The second disk storage device may include a hard disk drive and be associated with relatively slower performance characteristics.

A high priority data set of the database may be determined, at 504. In a particular embodiment, high priority data may be identified for moving to the solid state drive. Lower priority data may be identified and designated for moving to hard disk drive storage. For example, the priority data identification instructions 148 of FIG. 1 may be executed by the processor 126 to identify high priority data 142 stored within the mass storage 130. The priority data identification instructions 148 may further assign a priority to the data. For example, a priority may be assigned based upon one or more of how frequently the data is used (e.g., high frequency data), based upon the type of data (e.g., bootstrap data), or based upon a manual designation of the data.

A rebalancing operation may be conducted, at 506. For example, referring to FIG. 1, rebalancing instructions 152 may be executed by the processor 126 to substantially evenly distribute data among different storage devices of the mass storage 130. The rebalancing operation includes moving the high priority data set to the solid state memory device and evening distribution of other data of the database as between the plurality of storage devices. As discussed herein, the determination as to where to store the high priority data may be based upon matching the priority of the data to a stored performance characteristic of the storage device.

FIG. 6 is a block diagram of a computing system 600 configured to manage database data by conducting a rebalancing operation according to data prioritization and using different types of data storage devices, such as the data storage devices of FIG. 1. In an exemplary embodiment, the computing system 600 is configured to execute the method of FIG. 3, 4, or 5 to manage a database.

In the depicted example, the computing system 600 includes a processor 608, a main memory 610, an input device 612, such as a keyboard or mouse, a display device 614, and a network adapter 616. The network adapter 616 is coupled to client computers 618, 620.

The main memory 610 may include rebalancing instructions 622 installed onto a computer readable medium, such as computer memory storage. The rebalancing instructions 622 may be executable by the processor 608. The rebalancing instructions 622 may substantially evenly distribute data among different storage devices of a database 624. According to one particular embodiment, the rebalancing instructions 622 may be executed to move high priority data to a solid state drive device of the database 624. Lower priority data may be moved to a hard disk drive device of the database 624. The main memory 610 may also include the disk detection instructions 626, a disk topology 628, and priority identification instructions 630.

In an embodiment, the rebalancing instructions 622 of FIG. 6 may correspond to the rebalancing instructions 152 of FIG. 1. The disk detection instructions 626 of FIG. 6 may correspond to the disk detection instructions 146 of FIG. 1. The disk topology 628 of FIG. 6 may correspond to the disk topology 160 of FIG. 1, and the priority identification instructions 630 of FIG. 6 may correspond to the priority identification instructions 148 of FIG. 1.

An operating system (not shown) may execute on the processor 608 and coordinate control of various components within the computing system 600. The operating system may include an operating system such as Microsoft® Windows® XP (Microsoft and Windows are trademarks of Microsoft Corporation in the United States, other countries, or both), Linux, and Unix-based operating systems. An object oriented programming system, such as the C++ programming system, may run in conjunction with the operating system and provide calls to the operating system from C++ programs or applications executing on the computing system 600.

The hardware in the computing system 600 may vary depending on the implementation. Other internal hardware or peripheral devices, such as flash memory, equivalent non-volatile memory, or optical disk drives and the like, may be used by the computing system 600 but are not specifically illustrated in FIG. 6 to simplify the explanation. Also, the processes of the disclosed illustrative embodiments may be applied to a multiprocessor data processing system.

The depicted examples described with respect to FIG. 6 are not meant to imply architectural limitations. For example, portions of the computing system 600 may be implemented in a personal computer, a server, a server cluster, a tablet computer, a laptop computer, or a communication device.

Particular embodiments of the computing system 600 can take the form of an entirely hardware embodiment, an entirely software embodiment, or an embodiment containing both hardware and software elements. In a particular embodiment, the disclosed methods are implemented in software that is embedded in a processor readable medium and executed by a processor (including but not limited to firmware, resident software, microcode, etc).

Further, embodiments of the present disclosure, such as the one or more embodiments in FIGS. 1-6, can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, or communicate the program, or portions thereof, for use by or in connection with the computer, the instruction execution system, an apparatus, or a computing device.

In various embodiments, the medium can include an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write memory (CD-R/W) and digital versatile disk (DVD).

In operation, a particular embodiment may analyze an underlying disk technology by using an API to query system data structures and classify different disk types. A disk topology of how the data is currently stored may be created. For example, the disk topology may store information indicating which part of database is stored on which type of disk. Priority assignment rules may be input that include advantages of the various disks. The priority assignment rules may prompt the system to store highly accessed or otherwise important data (which may not be the most accessed) within a solid state drive device. The most accessed or other prioritized data as indicated by the priority assignment rules may be identified. Rebalancing may occur in a manner according to the input rules.

During a rebalancing operation of one particular embodiment, data may be substantially evenly distributed among a hybrid array of solid state drive and hard disk drive devices. For example, index data may be placed on the solid state drive devices. The index data may thus have faster read performance. Because the index data is read more frequently than other types of data and because solid state drive devices require less power than hard disk drive devices, database operations may be more energy efficient over time.

In another particular embodiment, encrypted data is allocated to the solid state drive devices, and unencrypted data may be allocated to the hard disk drive devices. Encrypted data generally takes longer to process than unencrypted data, so including the encrypted data on a relatively faster solid state drive device may improve performance. Although the encrypted data may not be accessed with a high as frequency as other data, the encrypted data may be automatically redistributed to the solid state drive to reduce access times.

In another particular embodiment, a rebalancing operation may include moving extents, or contiguous areas of storage, from one location to another to keep the data striped. The rebalancing operation may be initiated in response to an addition of a new container. Data is not randomly distributed among the solid state drive devices and the hard disk drive devices. Instead, data may be automatically redistributed during rebalancing based on the underlying disk storage type and without system downtime.

In another particular embodiment, the automatic identification of bootstrap data may reduce startup times. When user issues the first connect to a database, the computer system may internally issue an activate operation to the database. A conventional activate operation may be relatively slow, taking up to several minutes to retrieve data from a hard disk into a main memory. The data used by the activate operation includes bootstrap data. Database bootstrap data typically includes system catalog table data that includes a schema of tables containing metadata about all other objects/users within the database. Package data includes bootstrap data that may be used to bind a database and may include precompiled statements and access plans, among other data. Active database log files are examples of bootstrap data that may be used to verify a log sequence number in an active log file with the database data. Index data may include data structures used for enhancing lookups on tables. In the particular embodiment, such bootstrap data may be automatically redistributed during rebalancing based on the underlying disk storage type to reduce startup times.

In another particular embodiment, frequently accessed data (i.e., high frequency data) may be maintained in bufferpools, or caches. Data stored in a cache includes cache objects. These cache objects are typically subject to a Least Recently Used (LRU) policy that promotes constant change. For example, the cache objects are continuously swapped in between the disk and main memory. During low main memory conditions, these LRU operations frequently access disk storage. Identifying and moving cache objects to solid state or a phase change technology disk may improve database performance by reducing cache misses. Processes of embodiments may proactively identify and intelligently place high frequency, low cache hit ratio objects. Such processes may occur while the database objects are online, i.e., with no downtime requirement. This feature may enable more environmentally advantageous database setups.

Benefits gleaned from particular embodiments may include improved access and read times attributable to the performance characteristics of the solid state device. Another particular embodiment may include fewer mechanical parts and increased resiliency, as well as diminished noise. The hardware of a particular embodiment may be relatively light and energy efficient. A particular embodiment may automatically consider advantages of the underlying disk technology while rebalancing data. By pairing a type of data with a storage device having desirable performance characteristics, performance may be enhanced. For instance, more energy efficient database management may be realized.

The previous description of the disclosed embodiments is provided to enable a person skilled in the art to make or use the disclosed embodiments. Various modifications to these embodiments will be readily apparent to those skilled in the art, and the generic principles disclosed herein may be applied to other embodiments without departing from the scope of the disclosure. For example, other embodiments may include a hybrid disk drive. A hybrid drive, or Hybrid Hard Drive (HHD), is a type of large-buffer computer hard disk drive that uses a solid-state drive as a cache. Additionally, another particular embodiment may include a phase change disk. A phase change disk includes a type of rewritable optical disk drive that employs a phase change recording method. The particular embodiment may store high priority data on a phase change disk in an analogous manner to the processes that store high priority data to the solid state memory device described above. For example, the storage device 202 of FIG. 2 may include a phase change disk in a particular, alternative embodiment. Thus, the present disclosure is not intended to be limited to the embodiments shown herein, but is to be accorded the widest scope possible consistent with the principles and features as defined by the following claims.

What is claimed is:

1. A computer program product comprising a computer readable storage device storing computer readable program code embodied therewith, the computer readable program code comprising program code executable by a computer to:
   assign a priority tag to each data item of multiple data items in a database system according to one or more priority assignment rules, the multiple data items including data, the priority tag of each data item classifying the data item as a high priority data item or a low priority data item, wherein data items classified as high priority data items include frequently-accessed data or boot data;

identify each of a plurality of hardware data storage devices in the database system to obtain identified hardware data storage devices, wherein the identified hardware data storage devices include a first hardware data storage device identified as a first type and a second hardware data storage device identified as a second type, wherein the first hardware data storage device comprises a solid state memory and the second hardware data storage device comprises a hard disk memory, and wherein hardware data storage devices of the first type have faster memory access times than hardware data storage devices of the second type; and in response to one or more rebalancing triggers occurring at least when a storage device is added or deleted from the database system, execute a balancing operation, that includes a first move operation and a second move operation, wherein, in response to the balancing operation being executed:

the first hardware data storage device has a greater amount of data than the second hardware data storage device, and the first hardware data storage device includes the high priority data items and at least one low priority data item of the low priority data items and the second hardware data storage device includes at least one low priority data item of the low priority data items, wherein the first move operation is performed to move the high priority data items of the multiple data items to the first hardware data storage device, and wherein the second move operation is performed to evenly distribute the low priority data items of the multiple data items among the identified hardware data storage devices.

2. The computer program product of claim 1, wherein the second hardware data storage device comprises a hard disk memory.

3. The computer program product of claim 1, wherein the second move operation is performed after the first move operation, and wherein, in response to the balancing operation being executed, the first hardware data storage device includes the high priority data items and at least one low priority data item of the low priority data items.

4. The computer program product of claim 1, wherein the program code is executable by the computer to determine that at least one hardware data storage device has been removed from database use, and wherein a second balancing operation is automatically executed in response to a determination that the at least one hardware data storage device has been removed.

5. The computer program product of claim 1, wherein identification of each of the plurality of hardware data storage devices comprises executing, by the computer, disk detection instructions to query system data structures through an application programing interface of the plurality of hardware data storage devices.

6. The computer program product of claim 1, wherein identification of each of the plurality of hardware data storage devices comprises determining a performance attribute associated with each of the plurality of hardware data storage devices.

7. The computer program product of claim 1, wherein identification of each of the plurality of hardware data storage devices comprises creating a disk topography, and wherein the disk topography includes location data that indicates on which identified data storage device of the plurality of hardware data storage device each data item of the multiple data items is stored.

8. The computer program product of claim 7, wherein the disk topography further includes at least one performance attribute associated with each of the plurality of hardware data storage devices.

9. A method of using a processor to manage a database system, the method comprising:

assigning, according to one or more priority assignment rules, a priority tag to each data item of multiple data items in the database system, the data items including data, the priority tag of each data item classifying the data item as a high priority data item or a low priority data item, wherein data items classified as high priority data items include frequently-accessed data or boot data;

identifying each of a plurality of hardware data storage devices, wherein identified hardware data storage devices include a first hardware data storage device identified as a first type and a second hardware data storage device identified as a second type, wherein hardware data storage devices of the first type are more energy efficient or faster than hardware data storage devices of the second type, wherein the first hardware data storage device comprises a solid state memory and the second hardware data storage device comprises a hard disk memory; and in response to one or more rebalancing triggers corresponding to when a storage device is added or deleted from the database system, occurring at regular intervals, occurring through manual system administrator input, or a combination thereof, executing a balancing operation, wherein executing the balancing operation comprises:

performing a first move operation to move high priority data items of the multiple data items to the first hardware data storage device, and performing a second move operation to evenly distribute the low priority data items among the identified hardware data storage devices, wherein, in response to the balancing operation being executed, the first hardware data storage device has a greater amount of data than the second hardware data storage device, and wherein, in response to the balancing operation being executed, the first hardware data storage device includes the high priority data items and at least one low priority data item of the low priority data items and the second hardware data storage device includes at least one low priority data item of the low priority data items.

10. The method of claim 9, further comprising:

determining if a first number of the multiple data items classified as low priority data items stored in the first hardware data storage device is greater than a second number of the multiple data items classified as low priority data items stored in the second hardware data storage device; and in response to determining that the first number is greater than the second number, executing a second balancing operation that includes moving a portion of the low priority data items from the first hardware data storage device to the second hardware data storage device.

11. The method of claim 9, wherein, when the plurality of hardware data storage devices includes multiple hardware data storage devices of the first type, the first move operation evenly distributes the high priority data items among the multiple hardware data storage devices of the first type.

12. The method of claim 9, further comprising detecting a change in a number of the identified hardware data storage devices, wherein a second balancing operation is executed in response to detecting the change.

13. The method of claim 9, further comprising determining whether each data item classified as a high priority data item is stored in at least one identified hardware data storage device of the second type, wherein a second balancing operation is executed in response to determining that a particular data item classified as a high priority data item is stored in the at least one identified hardware data storage device of the second type.

14. A computer program product comprising a computer readable storage device storing computer readable program code embodied therewith, the computer readable program code comprising program code executable by a processor to:
assign, according to one or more priority assignment rules, priority tags to data items in a database system, the data items including data, the priority tag of each data item classifying the data item as a high priority data item or a low priority data item, wherein data items classified as high priority data items include frequently-accessed data or boot data;
determine whether each data item classified as a high priority data item is stored in a first hardware data storage device of a first type or in a second hardware data storage device of a second type, wherein the first hardware data storage device of the first type comprises a solid state memory and the second hardware data storage device comprises a hard disk memory, and wherein hardware data storage devices of the first type have faster memory access times than hardware data storage devices of the second type; and
in response to determining that a data item classified as a high priority data item is stored in the second hardware data storage device of the second type, execute a balancing operation that includes a first move operation and a second move operation,
wherein, in response to the balancing operation being executed, the first hardware data storage device has a greater amount of data than the second hardware data storage device,
wherein, in response to the balancing operation being executed, the first hardware data storage device includes the high priority data items and at least one low priority data item of the low priority data items and the second hardware data storage device includes at least one low priority data item of the low priority data items,
wherein the first move operation is performed to move the data item classified as the high priority data item from the second hardware data storage device of the second type to the first hardware data storage device of the first type, and
wherein the second move operation is performed to evenly distribute the low priority data items among the hardware data storage devices.

15. The computer program product of claim 14, wherein hardware data storage devices of the first type are rated as having higher energy efficiency than hardware data storage devices of the second type.

16. The computer program product of claim 14, wherein the program code is executable by the processor to:
determine that a particular hardware data storage device has been added for database use;
when the particular hardware data storage device has been added, identify the particular hardware data storage device as an identified hardware data storage device for storing data items in the database system; and
execute a second balancing operation in response to a determination that the particular hardware data storage device has been added.

17. A computing system for managing a database system, the computing system comprising:
at least one memory device for storing program code; and
at least one processor for executing the program code to:
assign priority tags according to one or more priority assignment rules to data items in the database system, the data items including data, the priority tag of each data item classifying the data item as a high priority data item or a low priority data item, wherein data items classified as high priority data items include frequently-accessed data or boot data;
determine whether each data item classified as a high priority data item is stored in at least one identified hardware data storage device of a first type or in at least one identified hardware data storage device of a second type, wherein hardware data storage devices of the first type are more energy efficient or faster than hardware data storage devices of the second type, wherein the at least one identified hardware data storage device of the first type comprises a solid state memory, and wherein the at least one identified hardware data storage device of a second type comprises a hard disk memory; and
in response to determining that a data item classified as a high priority data item is stored in the at least one identified hardware data storage device of the second type, execute a balancing operation that includes a first move operation and a second move operation,
wherein the first move operation is performed to move the data item classified as the high priority data item from the at least one identified hardware data storage device of the second type to the at least one identified hardware data storage device of the first type,
wherein the second move operation is performed to evenly distribute the low priority data items among the identified hardware data storage devices,
wherein, in response to the balancing operation being executed, the at least one identified hardware data storage device of the first type has a greater amount of data than the at least one identified hardware data storage device of the second type, and
wherein, in response to the balancing operation being executed, the at least one identified hardware data storage device of the first type includes the high priority data items and at least one low priority data item of the low priority data items and the at least one identified hardware data storage device of the second type includes at least one low priority data item of the low priority data items.

18. The computing system of claim 17, wherein the program code is executable by the at least one processor to:
determine that at least one hardware data storage device has been removed from database use; and
execute a second balancing operation in response to a determination that the at least one hardware data storage device is removed.

19. The computing system of claim 17, wherein, when there are more than one hardware data storage device of the first type in the database system, the first move operation evenly distributes data items classified as high priority data items among the hardware data storage devices of the first type.

20. The computing system of claim 17, wherein the hardware data storage devices of the first type are faster than the hardware data storage devices of the second type, and wherein the hardware data storage devices of the second type are less energy efficient than the hardware data storage devices of the first type.

\* \* \* \* \*